(12) United States Patent
Handing et al.

(10) Patent No.: US 12,539,751 B2
(45) Date of Patent: Feb. 3, 2026

(54) BATTERY HOLDER FOR A VEHICLE

(71) Applicant: Benteler Automobiltechnik GmbH, Paderborn (DE)

(72) Inventors: Christian Handing, Langenberg (DE); Kai Michel, Salzkotten (DE); Konstantin Tatarinov, Bielefeld (DE); Stefan Schmitz, Bielefeld (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 290 days.

(21) Appl. No.: 18/486,881

(22) Filed: Oct. 13, 2023

(65) Prior Publication Data

US 2024/0123810 A1    Apr. 18, 2024

(30) Foreign Application Priority Data

Oct. 17, 2022   (DE) .................... 10 2022 127 129.3

(51) Int. Cl.
*B60K 1/04*    (2019.01)
*B60R 16/04*   (2006.01)

(52) U.S. Cl.
CPC ............ *B60K 1/04* (2013.01); *B60R 16/04* (2013.01); *B60K 2001/0438* (2013.01)

(58) Field of Classification Search
CPC .... B60K 1/04; B60K 2001/0438; B60R 16/04
USPC ...................................... 180/68.5
See application file for complete search history.

(56) References Cited

U.S. PATENT DOCUMENTS

| | | | |
|---|---|---|---|
| 10,099,546 B2* | 10/2018 | Hara | B60K 1/04 |
| 2013/0192914 A1* | 8/2013 | Nakamori | B60L 50/64 |
| | | | 180/68.5 |
| 2024/0313322 A1* | 9/2024 | Faruque | B60R 16/04 |
| 2025/0030101 A1* | 1/2025 | Handing | H01M 50/244 |
| 2025/0158199 A1* | 5/2025 | Handing | H01M 50/244 |

FOREIGN PATENT DOCUMENTS

DE   10 2019 102 754 A1   8/2020
EP            2623353 A1   8/2013

* cited by examiner

*Primary Examiner* — Erick R Solis
(74) *Attorney, Agent, or Firm* — Holland & Hart LLP (57) ABSTRACT

The disclosure relates to a battery holder for receiving a plurality of battery cells or battery modules in an electrically driven vehicle, with a one-piece, uniform-material receiving tray for receiving the plurality of battery cells or battery modules, the receiving tray having a base plate and an outer wall which is arranged circumferentially around the base plate, the outer wall delimiting a tray interior of the receiving tray, an outer reinforcement, the outer reinforcement having a first reinforcement region, which is arranged on a lateral side of the outer wall facing away from the tray interior of the receiving tray and is connected to the outer wall, and wherein the outer reinforcement having a second reinforcing region, which is arranged on a side of the first reinforcing region facing away from the tray interior of the receiving tray and is connected to the first reinforcing region.

20 Claims, 9 Drawing Sheets

BATTERY HOLDER FOR A VEHICLE

CROSS-REFERENCE

The present application claims the benefit of German Patent Application No. 102022127129.3 by Handing et al., entitled "BATTERY HOLDER FOR A VEHICLE", filed Oct. 17, 2022, which is assigned to the assignee hereof and is incorporated by reference in its entirety.

TECHNICAL FIELD

The present disclosure relates to a battery holder for receiving a plurality of battery cells or battery modules in an electrically driven vehicle.

BACKGROUND

To hold battery cells or battery modules for the provision of electrical energy in electrically driven vehicles, battery holders comprising receiving trays are usually used, which are arranged between the axles of the vehicle.

A battery carrier designed as a battery tray is described, for example, in document DE 10 2016 115 647 B3.

Furthermore, a battery holder with a hollow profile is disclosed in document CN 108859712 B.

A battery holder with a hollow profile is also described in document U.S. Pat. No. 10,099,546 B2.

SUMMARY

It is the object of the present disclosure to provide another efficient battery holder.

This task is solved by the features of the independent claim. Advantageous examples are the subject of the dependent claims, the description and the accompanying figures.

The present disclosure is based on the finding that an external reinforcement attached to the outside of the receiving tray of the battery holder improves the structural stability of the receiving tray in such a way that in the event of a crash, in particular in the event of a side impact, forces acting on the receiving tray can be effectively absorbed, so that battery cells or battery modules arranged in the receiving tray can be effectively protected.

The present disclosure is based on the further finding that an external reinforcement with a first reinforcement region and a second reinforcement region arranged on the outside of the first reinforcement region can be formed in such a way that a hollow chamber can be formed between the first and second reinforcement regions, which provides an effective crumple zone, in order to effectively absorb forces acting on the battery holder during a crash, especially in the event of a side impact.

According to a first aspect, the disclosure relates to a battery holder for receiving a plurality of battery cells or battery modules in an electrically driven vehicle, with a one-piece, uniform material receiving tray for receiving the plurality of battery cells or battery modules, the receiving tray having a base plate and an outer wall, which is arranged circumferentially around the base plate, wherein the outer wall delimits a tray interior of the receiving tray, an external reinforcement, wherein the external reinforcement has at least a first reinforcement region, which is arranged on a lateral side of the outer wall facing away from the tray interior of the receiving tray and is connected to the outer wall, and wherein the external reinforcement has at least one second reinforcing region, which is arranged on a side of the first reinforcing region facing away from the tray interior of the receiving tray and is connected to the first reinforcing region, and wherein the second reinforcing region with the first reinforcing region delimits a hollow chamber at least partially and a plurality of fastening projections, wherein the fastening projections are formed in one piece with the external reinforcement, and wherein the fastening projections each have at least one fastening opening through which a fastening screw can be passed in order to fasten the receiving tray to an underbody structure, in particular side skirts, of the electrically driven vehicle, wherein the fastening projections are oriented in a direction transverse to a longitudinal extension direction of the external reinforcement and are designed to point away from the hollow chamber.

This achieves the technical advantage that the external reinforcement ensures a particularly effective improvement in the mechanical stability of the receiving tray, so that the battery holder can particularly effectively withstand forces occurring in the event of an crash, in particular in the event of a side impact.

Furthermore, the fastening projections formed in one piece with the external reinforcement ensure a structurally extremely stable connection of the receiving tray to the underbody structure of the vehicle.

In particular, the at least one fastening opening of the respective fastening projection of the plurality of fastening projections comprises a single fastening opening through which a single fastening screw can be passed in order to fasten the receiving tray to the underbody structure.

Alternatively, the at least one fastening opening of the respective fastening projection of the plurality of fastening projections comprises a plurality of fastening openings, with one fastening screw passing through each fastening opening of the plurality of fastening openings, in order to attach the receiving tray to the underbody structure.

In particular, the longitudinal extension direction of the external reinforcement extends parallel to the lateral side of the outer wall of the receiving tray, to which the external reinforcement is attached.

In particular, the hollow chamber delimited by the first and second reinforcement region extends at least longitudinally parallel to the longitudinal extension direction of the external reinforcement and in particular also parallel to the lateral side of the outer wall of the receiving tray to which the external reinforcement is attached.

In particular, the direction of extension of the fastening projections forms a right angle with the longitudinal direction of extension of the external reinforcement and in particular also with an extension direction of the lateral side of the outer wall of the receiving tray to which the external reinforcement is attached.

In particular, the outer wall completely surrounds the base plate.

In particular, a single module receptacle or a plurality of module receptacles, in particular arranged next to one another, for receiving the battery cells or battery modules is arranged in the tray interior of the receiving tray.

The base plate can also have a heat exchanger structure for temperature control of the battery cells or battery modules, the heat exchanger structure in particular having hollow fluid channels which are formed within the base plate and designed to conduct fluid.

In one example, the at least one first reinforcement region comprises two first reinforcement regions, which are arranged on opposite lateral sides of the outer wall, or the at least one first reinforcement region comprises four first reinforcement regions, two of the four first reinforcement regions being arranged on opposite lateral sides of the outer wall, and wherein the at least one second reinforcement region comprises two second reinforcement regions which are arranged on opposite sides of the first reinforcement regions, or wherein the at least one second reinforcement region comprises four second reinforcement regions, two of the four second reinforcement regions being arranged on opposite sides of the first reinforcement regions.

This achieves the technical advantage that by arranging the respective reinforcement regions on both or four sides on opposite lateral sides of the outer wall, a uniform stabilization of the receiving tray is achieved by the external reinforcement.

In particular, the at least one first reinforcement region comprises two first reinforcement regions which are arranged on opposite lateral sides of the outer wall, and the at least one second reinforcement region comprises two second reinforcement regions which are arranged on opposite sides of the first reinforcement regions.

Alternatively, the at least one first reinforcement region comprises four first reinforcement regions, with two of the four first reinforcement regions being arranged on opposite lateral sides of the outer wall, and the at least one second reinforcement region comprises four second reinforcement regions, with two of the four second reinforcement regions being arranged on opposite sides of the first reinforcement regions, respectively.

In one example, the outer wall of the receiving tray has four lateral sides, with two adjacent lateral sides being connected to one another by a corner connection of the outer wall, wherein the first reinforcement region has a lateral region which is connected to one of the four lateral sides of the outer wall, in particular connected in a materially bonded manner, and wherein the first reinforcement region has two corner areas, which are each connected to one of the two corner connections of the outer wall, in particular are connected in a materially bonded manner.

This achieves the technical advantage that a particularly stable attachment of the external reinforcement to the receiving tray is achieved by connecting the first reinforcement region to the corresponding lateral side and to the two corresponding corner connections of the outer wall.

In one example, the fastening projections comprise corner fastening projections which are formed in one piece with the corner regions of the first reinforcement region, the corner fastening projections each having at least one fastening opening through which a fastening screw can be passed in order to fasten the receiving tray to the underbody structure of the electrically driven vehicle.

This achieves the technical advantage that a particularly stable connection of the battery holder to the underbody structure of the electrically driven vehicle is ensured by the corner fastening projections formed on the corner regions of the first reinforcement region. In addition, the corner fastening projection allows as part of the first reinforcement region in the event of a side crash to provide an additional stable load path adapted to the shape of the tray over the outer wall of the receiving tray to an opposite connection point.

In one example, the corner regions of the first reinforcement region each have a corner reinforcement element which is designed to structurally stabilize the corner regions of the first reinforcement region, wherein in particular the corner fastening projections are connected to the respective corner reinforcement element.

This achieves the technical advantage that the corner reinforcement element stabilizes the first reinforcement region in the area of the corner fastening projections and the tray and optimally transfers the load in the event of a side crash. In particular, the respective corner reinforcement element extends at an angle or in an arc shape between the respective corner region of the first reinforcement region and the respective corner fastening projection.

In one example, the first reinforcement region is formed from a high-strength steel or as a press-hardened first reinforcement region made from sheet steel, which in particular has a tensile strength between 1000 and 2000 MPa.

This achieves the technical advantage that the corresponding material ensures a particularly high resistance for the first reinforcement region.

In one example, the first reinforcing region and the second reinforcing region of the external reinforcement are formed by different components, the second reinforcing region being shaped as a sheet metal shell, which is connected to the side of the first reinforcing region facing away from the tray interior of the receiving tray, in particular is connected in a materially bonded manner, in order to at least partially delimit the hollow chamber lengthwise between the second reinforcement region and the first reinforcement region.

This achieves the technical advantage that simple production of a correspondingly stable external reinforcement is made possible according to a first variant, in which the second reinforcement region is simply welded onto the first reinforcement region.

In one example, wherein the second reinforcing region designed as a sheet metal shell has a further lateral region, which is connected to a lateral region of the first reinforcing region and not to a corner region of the first reinforcing region, the second reinforcing region in particular having at least one sheet metal projection, which is connected to a corner reinforcing element of the first reinforcing region, in particular is connected in a materially bonded manner.

This achieves the technical advantage that the connection between the further lateral region of the second reinforcement region and the lateral region of the first reinforcement region ensures effective attachment of the second reinforcement region to the first reinforcement region. The particular sheet metal projection of the second reinforcement region ensures an effective connection to a corner reinforcement element.

In one example, the fastening projections comprise first lateral fastening projections, which are formed in one piece with the first reinforcing region, in particular with the lateral region of the first reinforcing region.

This achieves the technical advantage that the first lateral fastening projections are stably formed on the first reinforcement region of the external reinforcement and enable the battery holder to be effectively fastened to the underbody component of the electrically driven vehicle.

In particular, at least one spacer bushing is arranged coaxially to the at least one fastening opening on the respective lateral fastening projection.

In one example, the fastening projections comprise second lateral fastening projections which are formed in one piece with the second reinforcement region, in particular with a further lateral region of the second reinforcement region, wherein in particular the first lateral fastening projections formed in one piece with the first reinforcement region and the second lateral fastening projections formed in one piece with the second reinforcement region are arranged in alignment with one other and are materially bonded to one another.

This achieves the technical advantage that the second lateral fastening projections arranged on the second reinforcement region ensure a particularly effective reinforcement of the structural connection to the underbody component. The particularly aligned arrangement or cohesive connection of the second lateral fastening projections arranged on the second reinforcement region to or with the first lateral fastening projections arranged on the first reinforcement region results in a particularly stable structural connection of the receiving tray to the underbody structure of the vehicle.

In one example, the fastening projections, in particular the first lateral fastening projections and/or the second lateral fastening projections, are each joined to a lateral fastening arm and together each enclose a cavity, the lateral fastening arms each having at least one fastening opening through which a fastening screw can be inserted, respectively, to attach the receiving tray to an underbody component of the electrically driven vehicle.

This achieves the technical advantage that a particularly advantageous lateral reinforcement of the fastening projections, in particular the first lateral fastening projections and/or the second lateral fastening projections, is achieved by the lateral fastening arm.

In particular, the respective lateral fastening arm is formed at least partially on the underside by the respective first lateral fastening projection and on the top by the respective second lateral fastening projection.

In particular, the respective fastening opening of the respective lateral fastening arm includes the respective fastening opening of the respective first lateral fastening projection and the respective fastening opening of the respective second lateral fastening projection.

In one example, the lateral fastening arms each have a lateral connection arm, which is materially bonded to the lateral region of the first reinforcement region or to the further lateral region of the second reinforcement region, and wherein the respective lateral fastening arm extends at an angle, in particular at a right angle, from the lateral connection arm.

This achieves the technical advantage that the lateral connection arm ensures a particularly stable connection to the first reinforcement region.

In one example, the at least one fastening opening of the respective lateral fastening projection is arranged on a side of the lateral fastening projection facing away from the lateral connection arm.

In particular, the fastening projections and/or the corner fastening projections are oriented away from the hollow chamber in such a way that a distance between a virtual connecting line between two adjacent fastening openings and the second reinforcement region in the area of the hollow chamber, measured transversely to a longitudinal extent of the external reinforcement, is between 10 mm and 200 mm, preferably between 20 mm and 100 mm.

This achieves the technical advantage that a structurally particularly advantageous external connection of the respective lateral fastening projection is achieved through the fastening opening.

In one example, a bend is arranged between the lateral connection arm and the lateral fastening arm, which is designed to stabilize the lateral fastening arm which extends at an angle, in an arc or in multiple steps from the lateral connection arm.

This achieves the technical advantage that structural stabilization is achieved between the lateral connection arm and the lateral fastening arm.

In one example, the first reinforcing region and the second reinforcing region of the external reinforcement are formed in one piece, wherein a plurality of bent-up sections extend from the first reinforcing region on the side of the first reinforcing region facing away from the tray interior of the receiving tray, which bent-up sections form the second reinforcing region, wherein the second reinforcing region formed as bent-up sections with the side of the first reinforcing region facing away from the tray interior of the receiving tray delimit at least one hollow chamber, wherein the bent-up sections of the second reinforcing region are connected to the first reinforcing region in order to form the hollow chamber, in particular by means of a joining process.

This achieves the technical advantage that, according to a second variant alternative to the first variant, the second reinforcement region can also be provided by simply bending the sections extending from the first reinforcement region and connecting them to the first reinforcement region in order to delimit the at least one hollow chamber, or that a joining process enables a simple and advantageous connection of the bent-up sections of the second reinforcement region to the first reinforcement region.

In one example, the fastening projections include further lateral fastening projections which are integrally formed with the first reinforcing region.

This achieves the technical advantage that the further lateral fastening projections formed in one piece with the first reinforcement region ensure a particularly effective connection of the first reinforcement region to the underbody component.

In one example, wherein the further lateral fastening projections of the first reinforcement region are arranged between the bent-up sections of the second reinforcement region.

This achieves the technical advantage of ensuring a structurally stable reinforcement region.

In one example, the battery holder has a cover which is connected to the outer wall to close off the tray interior from an external area of the battery holder.

This achieves the technical advantage that the cover effectively protects the battery cells or battery modules contained in the receiving tray from external influences.

In one example, the outer wall has an outer flange on a side facing away from the base plate, with a further outer flange of the cover being connected to the outer flange of the outer wall, in particular connected in a materially bonded, form-fitting and/or force-fitting manner, in order to ensure effective attachment of the cover to the outer wall.

This achieves the technical advantage that an effective connection between the cover and the outer wall is achieved.

In one example, the first reinforcement region and/or second reinforcement region has a plurality of stiffening regions which are designed to increase the mechanical stability of the first reinforcement region and/or second reinforcement region in order to ensure improved side impact protection.

This achieves the technical advantage that the stiffening areas can specifically increase the structural stability in the areas of the external reinforcement in which particular force peaks occur in the event of a crash.

In one example, the first and/or second reinforcement region has a plurality of deformation regions which are designed to deform in a directed manner when an impact force acts on the first and/or second reinforcement region in order to enable effective absorption of the impact force.

This achieves the technical advantage that the deformation areas in the external reinforcement can be selected in such a way that in the event of a crash, the deformation areas ensure a directed deformation of the corresponding areas of the external reinforcement so that no damage to the battery cells or battery modules occurs.

In one example, the battery holder has at least one stabilizing strut, in particular a cross strut, which is arranged on a side of the base plate facing away from the outer wall and is connected to the battery holder in order to increase the structural stability of the battery holder, with one stabilizing strut being arranged and aligned in this way that it forms a straight, continuous load path with two opposite sides of the receiving tray in order to transfer part of the impact energy from the impact side to the side facing away from the impact in the event of a side impact of the vehicle.

This achieves the technical advantage that the stabilization struts on the bottom advantageously increase the stability of the receiving tray.

In one example, a plurality of strut receptacles, to which the respective stabilization struts are attached, are arranged on an underside of the first reinforcement region in order to achieve effective attachment of the stabilization struts to the battery holder.

This achieves the technical advantage that effective fastening of the stabilizing struts is achieved.

In one example, a plurality of inner struts connected to the outer wall are arranged in the tray interior of the receiving tray, the inner struts in particular delimiting receiving areas for receiving the battery cells or battery modules.

This achieves the technical advantage that the inner struts ensure additional stabilization of the receiving tray and also effectively protect the battery cells or battery modules arranged between them.

In one example, the plurality of inner struts comprise a plurality of longitudinal struts arranged next to one another in the receiving tray, and a plurality of cross struts arranged next to one another in the receiving tray, the longitudinal struts and the cross struts being arranged at an angle, in particular at right angles, to one another.

This achieves the technical advantage that the stability of the receiving tray is increased even further through the use of longitudinal and cross struts.

In one example, the external reinforcement is designed as a hot-molded part or as a cold-formed part.

This achieves the technical advantage that an advantageous production of the external reinforcement is achieved.

In one example, the first reinforcement region and/or second reinforcement region has a plurality of longitudinal and/or transverse beads.

This achieves the technical advantage that the structural stability of the first and/or second reinforcement region can be advantageously increased by the beads.

In one example, the first reinforcement region has a plurality of holes.

This achieves the technical advantage that the weight of the first reinforcement region can be advantageously reduced through the holes, while at the same time ensuring structural stability.

BRIEF DESCRIPTION OF THE DRAWINGS

Further exemplary examples are explained with reference to the accompanying figures. They show.

DETAILED DESCRIPTION

Figure 1:
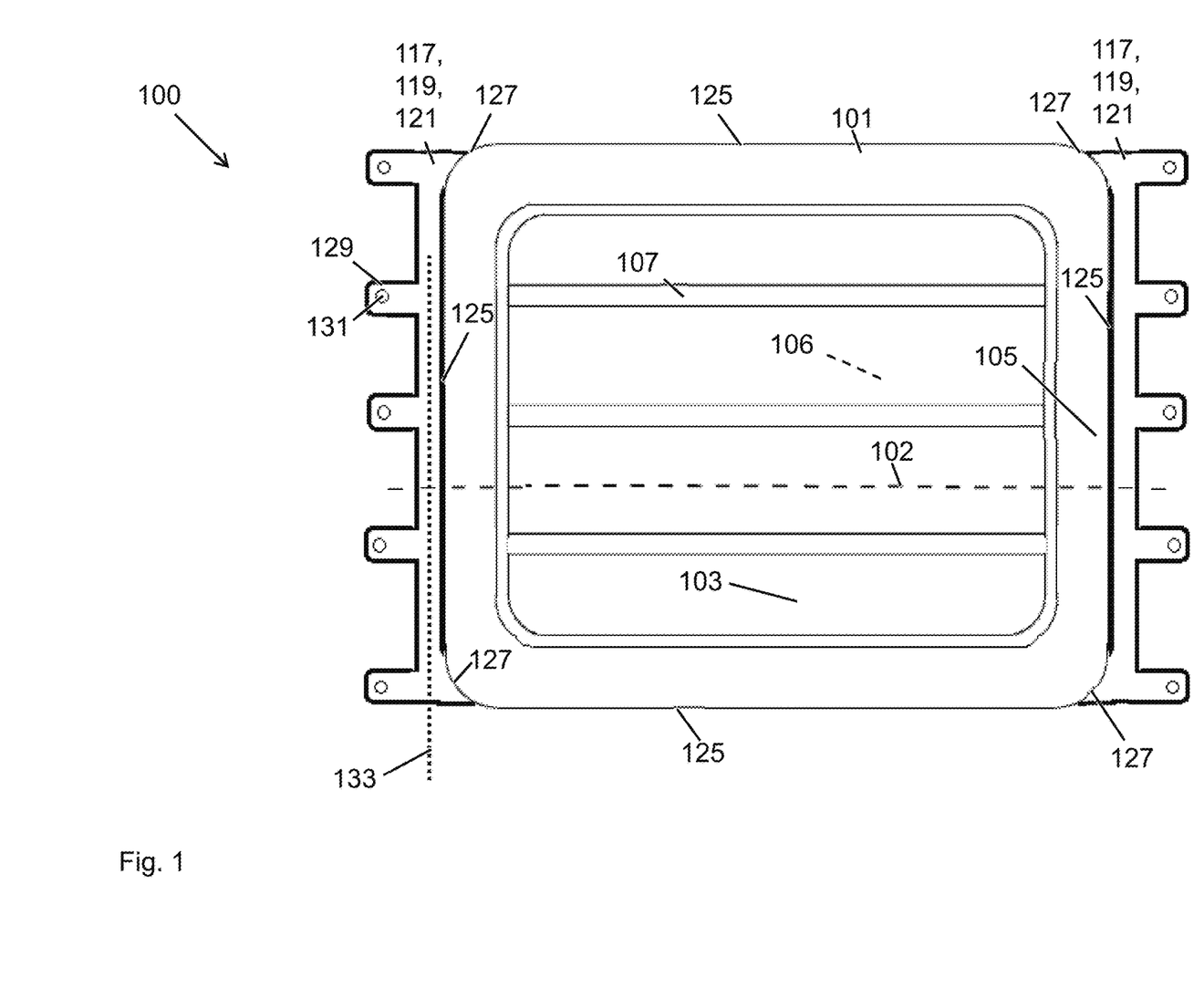
FIGS. 1 and 2 are schematic representations of a battery holder according to a first example.
Figure 2:
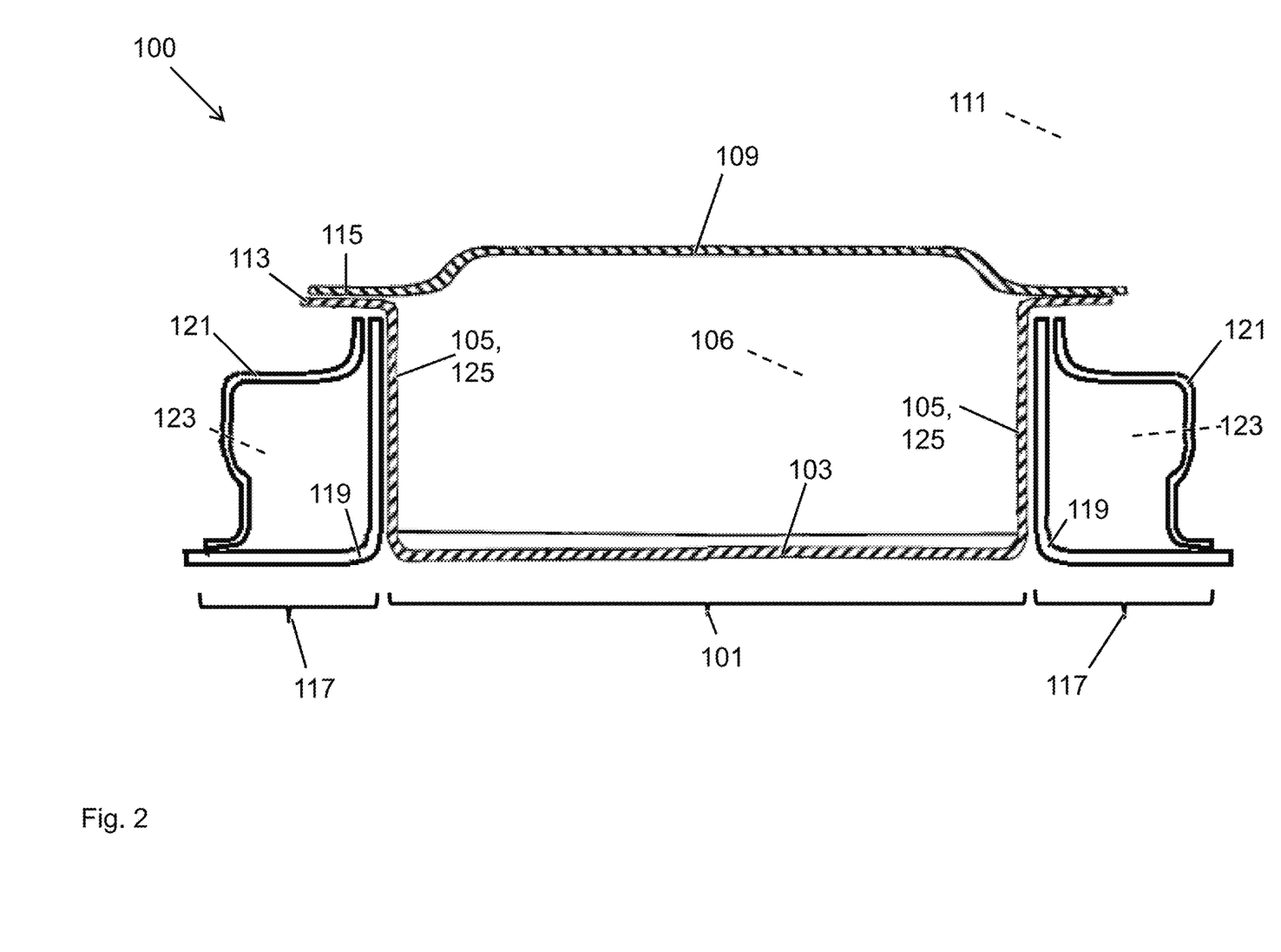

FIGS. 1 and 2 show schematic representations of a battery holder according to a first example, in particular a battery holder 100 for accommodating a plurality of battery cells or battery modules, not shown in FIGS. 1 and 2, in an electrically driven vehicle. FIG. 1 shows a top view of the battery holder 100 and FIG. 2 shows a sectional view through the battery holder 100, with the corresponding sectional axis 102 being highlighted in FIG. 1.

The battery holder 100 here has a receiving tray 101, shown schematically in FIGS. 1 and 2, for receiving the plurality of battery cells or battery modules. The receiving tray 101 is designed in one piece and made of the same material and has a base plate 103 and an outer wall 105, which is arranged circumferentially around the base plate 103. As can be seen from FIGS. 1 and 2, the outer wall 105 delimits a tray interior 106 of the receiving tray 101.

As can also be seen from FIG. 1, the battery holder 100 has a plurality of inner struts 107, which are arranged in the tray interior 106 of the receiving tray 101 and are connected, in particular welded, to the outer wall 105. As can be seen from FIG. 1, the inner struts 107 are arranged next to one another, in particular parallel to one another, in the receiving tray 101. Here, the inner struts 107 delimit receiving areas, not shown in FIGS. 1 and 2, for receiving the battery cells or battery modules.

The base plate 103 of the receiving tray 101 accommodates the plurality of battery cells or battery modules, the battery cells or battery modules not being shown in FIGS. 1 and 2. The plurality of electrical battery cells or battery modules can in particular be placed on the base plate 103, and the battery cells or battery modules are accommodated in particular in the receiving areas delimited by the inner struts 107.

As shown in FIG. 2, the battery holder 100 also has a cover 109, which is connected to the outer wall 105 in order to close off the tray interior 106 from an external area 111 of the battery holder 100, which is only shown schematically in FIG. 2.

Here, the outer wall 105 has an outer flange 113 on a side facing away from the base plate 103. A further outer flange 115 of the cover 109 is connected to the outer flange 113 of the outer wall 105, in particular connected in a materially bonded, form-fitting and/or force-fitting manner, in order to ensure effective attachment of the cover 109 to the outer wall 105.

Since the receiving tray 101 alone does not have sufficient structural stability in the event of a crash to adequately protect the battery cells or battery modules arranged in the receiving tray 101, the battery holder 100 has an external reinforcement 117 connected to the outer wall 105 of the receiving tray 101, which is designed to increase the structural stability of the receiving tray 101.

As can be seen in FIG. 2, the external reinforcement 117 has at least a first reinforcement region 119, which is arranged on a lateral side of the outer wall 105 facing away from the tray interior 106 of the receiving tray 101 and is connected with the outer wall 105, in particular is connected in a materially bonded manner.

As can be seen in FIG. 2, the external reinforcement 117 has at least a second reinforcement region 121, which is arranged on a side of the first reinforcement region 119 facing away from the tray interior 106 of the receiving tray 101 and is connected to the first reinforcement region 119, in particular is connected in a materially bonded manner. As can be advantageously seen in FIG. 2, the second reinforcement region 121 with the first reinforcement region 119 delimits a hollow chamber 123 at least partially along its length.

The two reinforcement regions 119, 121 of the external reinforcement 117 improve the structural stability of the outer wall 105 of the receiving tray 101 and the hollow chamber 123 arranged between the first and second reinforcement regions 119, 121 of the external reinforcement 117 provides an advantageous crumple zone of the external reinforcement 117, which allows for deformation of the external reinforcement 117 in the event of a crash.

As can be seen in FIG. 1 and FIG. 2, the external reinforcement 117 comprises two first reinforcement regions 119, which are arranged on opposite lateral sides 125 of the outer wall 105, and the external reinforcement 117 comprises two second reinforcement regions 121, which are arranged on the correspondingly opposite sides of the first reinforcement regions 119, and thus allow for an effective stabilization of the external reinforcement 117 on both sides.

According to an alternative example, not shown, the external reinforcement 117 can of course also include four first reinforcement regions 119, with two of the four first reinforcement regions 119 being arranged on opposite lateral sides 125 of the outer wall 105, and the external reinforcement 117 comprises four second reinforcement regions 121, each two of the four second reinforcement regions 121 are arranged on the corresponding opposite sides of the first reinforcement regions 119.

FIG. 1 shows that two adjacent lateral sides 125 of the outer wall 105 are connected to one another by a corner connection 127 of the outer wall 105. From FIG. 1 it can be seen that the external reinforcement 117, in particular the first reinforcement region 119, is each connected to both a lateral side 125 and to the respective corner connection 127 of the outer wall 105, in particular connected in a materially bonded manner. For further details, please refer to the following information.

From FIG. 2 it can be seen that according to the first example shown, the first reinforcement region 119 and the second reinforcement region 121 of the external reinforcement 117 are formed by different components. The second reinforcing region 121 is shaped as a sheet metal shell, which is connected to the side of the first reinforcing region 119 facing away from the tray interior 106 of the receiving tray 101, in particular is connected in a materially bonded manner, in order to close the hollow chamber 123 at least partially lengthwise between the second reinforcing region 121 and the first reinforcing region 119. For further details, please refer to the following information.

From FIG. 1 it can also be seen that the battery holder 100 has a plurality of fastening projections 129, which are formed in one piece with the external reinforcement 117. The fastening projections 129 each have at least one fastening opening 131, through which a fastening screw, not shown in FIG. 1, can be passed in order to fasten the receiving tray 101 to an underbody structure, also not shown in FIG. 1, in particular side skirt, of the electrically driven vehicle. In FIG. 1 it can also be seen that the fastening projections 129 are oriented in the direction transverse to a longitudinal extension direction 133 of the outer reinforcement 117 and are designed to point away from the hollow chamber 123. For further details, please refer to the following information.

Figure 3A:
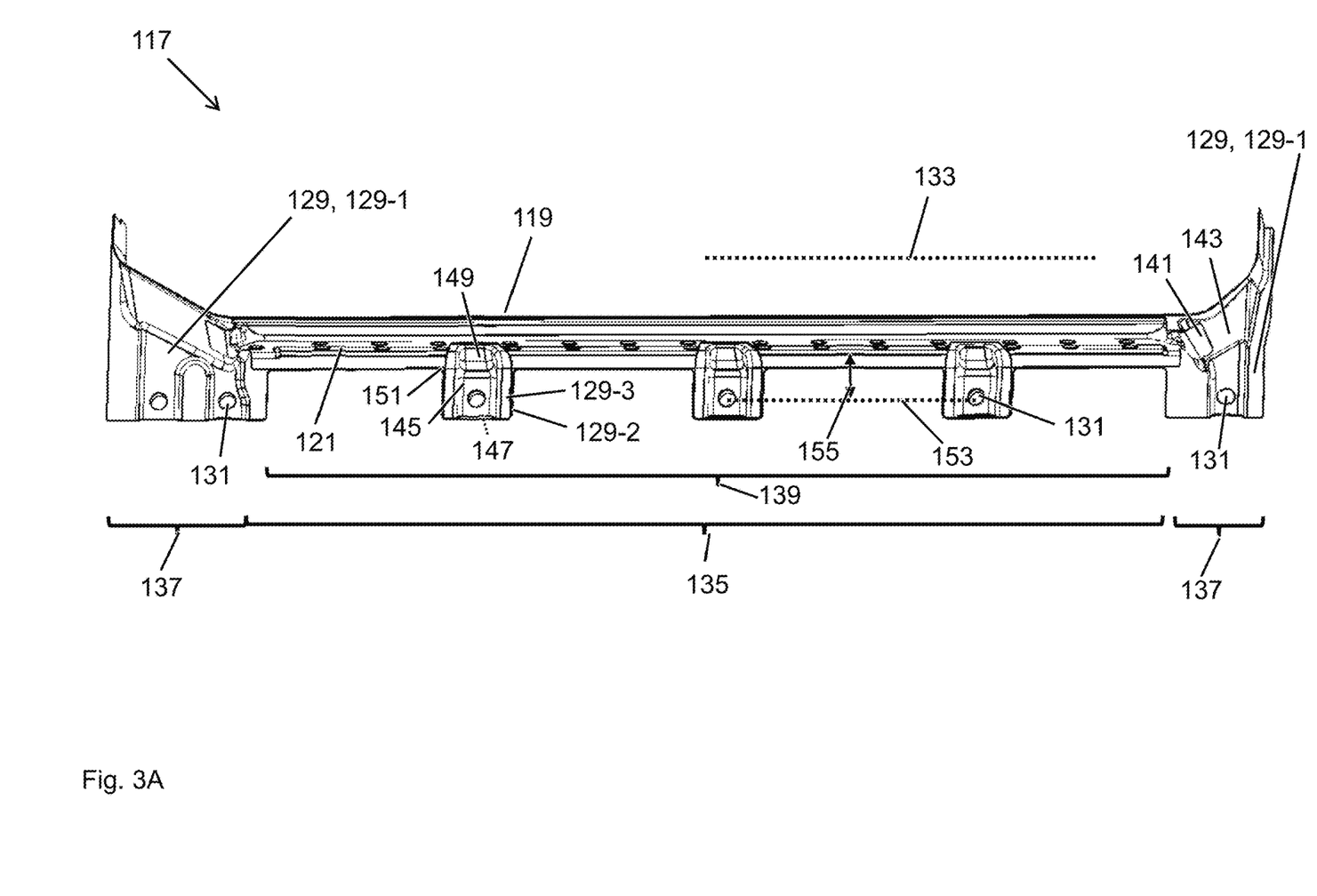
FIGS. 3A and 3B are perspective views of a section of a reinforcement region of the battery holder according to the first example shown in FIGS. 1 and 2.
Figure 3B:
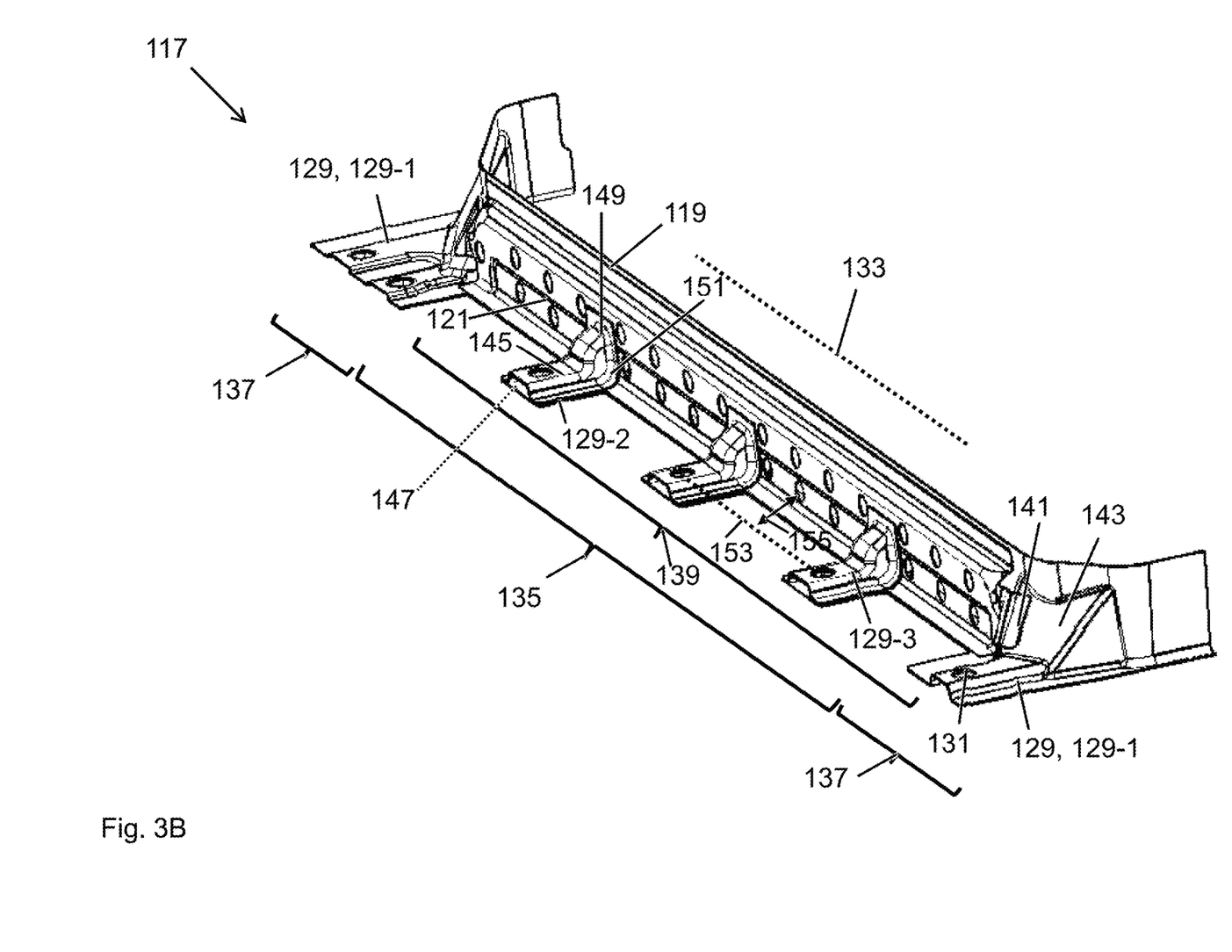

FIGS. 3A and 3B show perspective views of a section of a first reinforcement region of the battery holder according to the first example shown in FIGS. 1 and 2.

A front view is shown in FIG. 3A and an oblique view of the section of the first reinforcement region 119 of the battery holder 100 is shown in FIG. 3B.

As described with reference to FIGS. 1 and 2, the external reinforcement 117 comprises a first reinforcement region 119, which is connected on the outside to the outer wall 105 of the receiving tray 101, not shown in FIGS. 3A and 3B, and the external reinforcement 117 comprises a second reinforcement region 121, which is connected on the outside to the first reinforcement region 119 of the receiving tray 101 shown in FIGS. 3A and 3B. Here, the first and second reinforcement regions 119, 121 are formed as different components, which delimit a hollow chamber 123 between them, which cannot be seen in FIGS. 3A and 3B.

The first reinforcing region 119 is formed from a high-strength steel or as a press-hardened first reinforcing region 119 made of sheet steel, which in particular has a tensile strength between 1000 and 2000 MPa.

The first reinforcement region 119 has a lateral region 135, which is connected to one of the four lateral sides 125 of the outer wall 105 of the receiving tray 101 shown in FIG. 1, in particular is connected in a materially bonded manner. The first reinforcement region 119 also has two corner areas 137, which are each connected to one of the two corner connections 127 of the outer wall 105 shown in FIG. 1, in particular are connected in a materially bonded manner.

Here, the second reinforcement region 121, which is designed as a sheet metal shell, has a further lateral region 139, which is connected to the lateral region 135 of the first reinforcement region 119. In FIGS. 3A and 3B it can be seen that the further lateral region 139 of the second reinforcement region 121 is at least on one side, in particular not connected to the corner region 137 of the first reinforcement region 119, but the second reinforcement region 121 only has a sheet metal projection 141, which at least is connected on one side to a corner reinforcement element 143 of the first reinforcement region 119. The corner reinforcement element 143 stabilizes the first reinforcement region 119.

The fastening projections 129 shown only schematically in FIG. 1, further comprise, according to the view of FIG. 3A and FIG. 3B corner fastening projections 129-1, which are formed as a single piece with the corner region 137 of the first reinforcement region 119, wherein the corner fastening projections 129-1 each have a fastening opening 131, through which a fastening screw can be passed in order to fasten the receiving tray 101 to the underbody structure of the electrically driven vehicle.

The fastening projections 129 further comprise a plurality of, in particular three, first lateral fastening projections 129-2, which are formed in one piece with the lateral region 135 of the first reinforcing region 119. The first lateral fastening projections 129-2 also each have at least one fastening opening 131, through which a fastening screw can be passed in order to fasten the receiving tray 101 to the underbody component of the electrically driven vehicle.

The fastening projections 129 further include second lateral fastening projections 129-3, which are formed in one piece with the further lateral region 139 of the second reinforcement region 121, the second lateral fastening projections 129-3 each having at least one fastening opening 131, through which a fastening screw can be passed respectively, to attached the receiving tray 101 to an underbody component of the electrically driven vehicle. The second lateral fastening projections 129-3 are arranged in alignment with the first lateral fastening projections 129-2 and are materially bonded to the first lateral fastening projections 129-2 in order to provide particularly stable fastening projections. Here, a cavity 147 is formed between the respective first lateral fastening projection 129-2 and the respective second lateral fastening projection 129-3, which is described in more detail below.

The fastening projections 129 designed as first lateral fastening projections 129-2 or second lateral fastening projections 129-3 are respectively joined to a lateral fastening arm 145 and together each enclose a cavity 147, the lateral fastening arms 145 each having at least one fastening opening 131 through which a fastening screw can be inserted respectively in order to attach the receiving tray 101 to an underbody component of the electrically driven vehicle.

The lateral fastening arms 145 also each have a lateral connection arm 149, which is materially bonded to the further lateral region 139 of the second reinforcement region 121, and a lateral fastening arm 145 respectively extends at an angle, in particular at a right angle, from the respective lateral connection arm 149. Thus, the lateral connection arm 149 ensures effective attachment of the lateral attachment arm 145 to the second connection area 121.

In particular, a bend 151 is arranged between the lateral connection arm 149 and the lateral fastening arm 145, which is designed to stabilize the lateral fastening arm 145 which extends angularly from the lateral connection arm 149.

In particular, the at least one fastening opening 131 is of the respective first or second lateral fastening projection 129-2, 129-3 is arranged on a side of the respective lateral fastening projection 129-2, 129-3 facing away from the lateral connection arm 149.

In particular, the lateral fastening projections 129-2, 129-3 are oriented away from the hollow chamber 123 in such a way that a distance 155 between a virtual connecting line 153 between two adjacent fastening openings 131 and the second reinforcement region 121 in the area of the hollow space 147, measured transversely to the longitudinal direction 133 of the external reinforcement 117, is between 10 mm and 200 mm, preferably between 20 and 100 mm.

Figure 4:
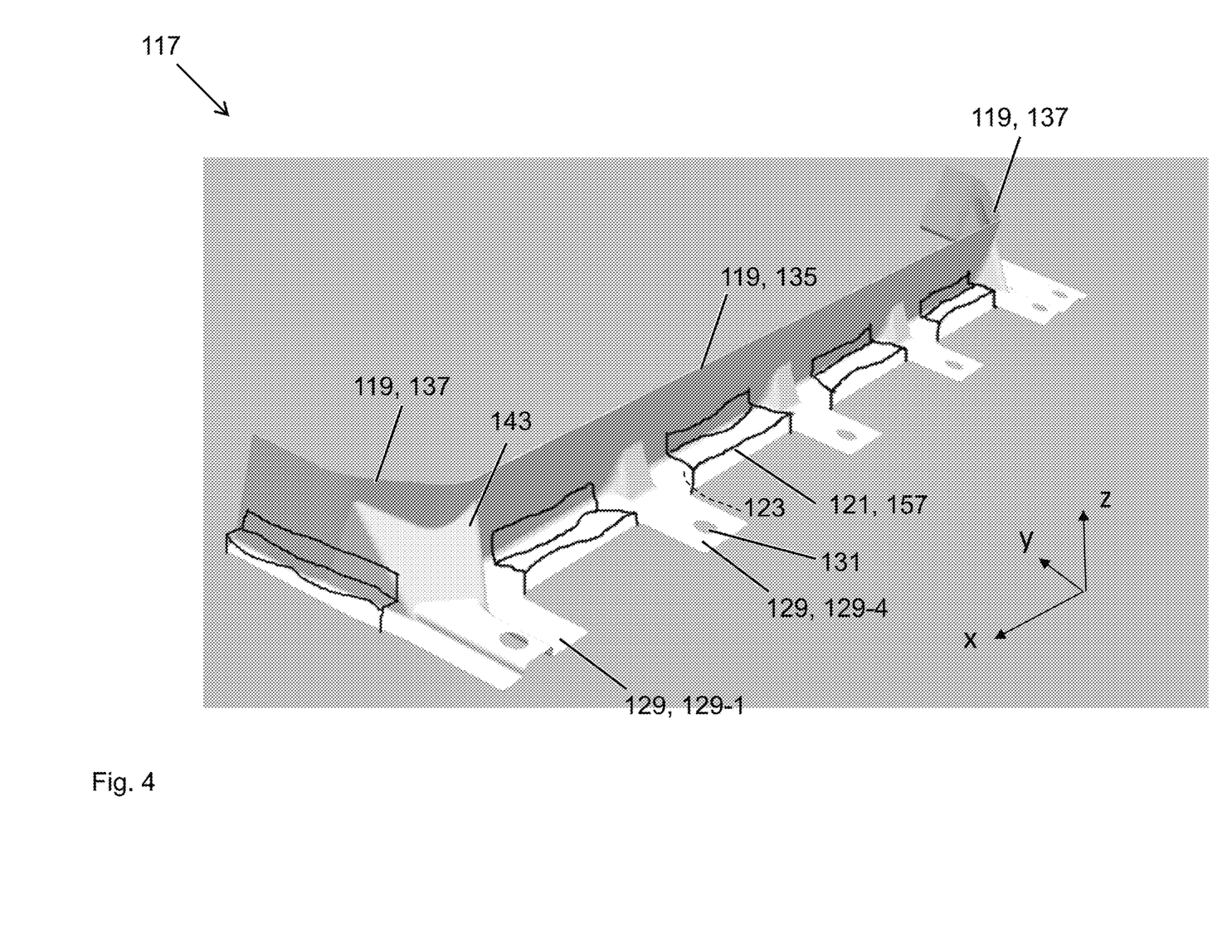
FIG. 4 shows a schematic representation of an external reinforcement of a battery holder according to a second example.

FIG. 4 shows a schematic representation of an external reinforcement of a battery holder according to a second example.

In the example shown in FIG. 4, the first reinforcement region 119 and the second reinforcement region 121 of the external reinforcement 117 are formed in one piece. The second reinforcement region 121 includes a plurality of sections 157 which are bent up on the side of the first reinforcement region 119 facing away from the tray interior 106 of the receiving tray 101 and which form the second reinforcement region 121, wherein the second reinforcement region 121, which is shaped as bent-up sections 157, delimits at least one hollow chamber 123 with the side of the first reinforcement region 119 facing away from the tray interior 106 of the receiving tray 101.

The bent-up sections 157 of the second reinforcement region 121 are connected to the first reinforcement region 119, in particular by means of a joining process, in order to form the hollow chamber 123.

The fastening projections 129 in this case include further lateral fastening projections 129-4, which are formed in one piece with the first reinforcement region 119, the further lateral fastening projections 129-4 each having at least one fastening opening 131, through which a fastening screw can be passed respectively, in order to fasten the receiving tray 101 on an underbody component of the electrically driven vehicle.

FIG. 4 also shows that the further lateral fastening projections 129-4 of the first reinforcement region 119 are arranged between the bent-up sections 157 of the second reinforcement region 121.

It is also possible for two further reinforcement regions to form a further hollow chamber by bending, which extends transversely to the first reinforcement region 119 and second reinforcement region 121 as well as to the hollow chambers 123, as it is possible, for example, in the corner area of the receiving tray (not shown).

Figure 5A:
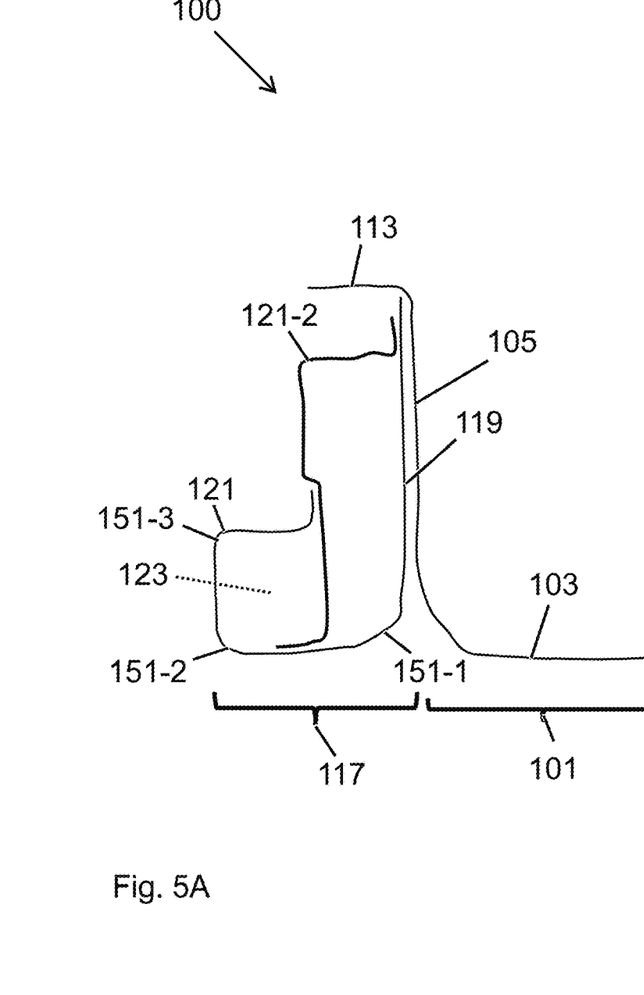
FIGS. 5A and 5B show schematic representations of cross sections through areas of the battery holder according to a further example, which represents a mixture of the example according to FIGS. 3A and 3*b* and the example according to FIG. 4.
Figure 5B:
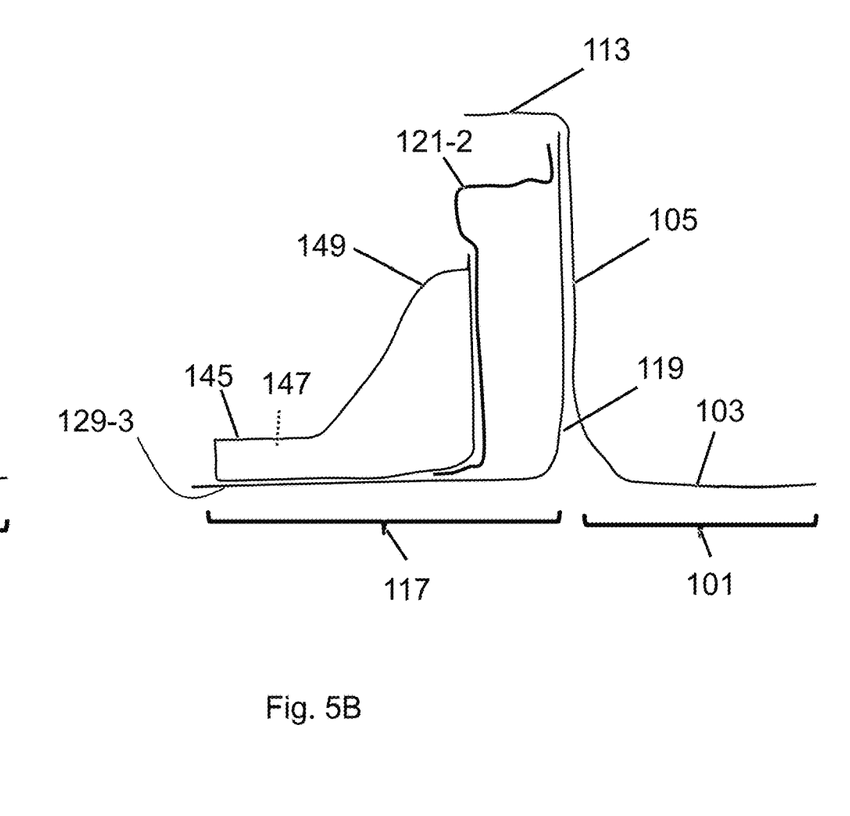

FIGS. 5A and 5B show schematic representations of cross sections through areas of the battery holder according to a further example, which represents a mixture of the example of FIGS. 3A and 3B and the example of FIG. 4.

The illustration shown in FIG. 5A showed an exemplary cross section through a receiving tray 101 in the area of the hollow chamber 123. The first reinforcement region 119 of the external reinforcement 117 is here connected to the outer wall 105 of the receiving tray 101. The second reinforcement region 121 of the external reinforcement 117 is formed in one piece with the first reinforcement region 119 of the external reinforcement 117, with a hollow chamber 123 being formed between the first and second reinforcement regions 119, 121. It can also be seen that the external reinforcement 117 is formed from a first sheet metal shell 119, which in cross section initially extends parallel to the outer wall 105 over the height of the battery holder 100 and through a first bend 151-1 into a horizontal section and through a second bend 151-2 is formed into the second reinforcement region 121. A third bend 151-3 of the sheet metal shell forms a further horizontal section at a height of, in particular, approximately half the height of the battery holder 100.

According to FIG. 5A, the external reinforcement comprises a further second reinforcement region 121-2, which is formed by a further sheet metal shell and is materially bonded to the outer wall-side end of the first sheet metal shell (first reinforcement region 119), while the end of the first sheet metal shell facing away from the outer wall 105 (first reinforcement region 119) is materially bonded.

FIG. 5B shows an exemplary cross section through the receiving tray 101 of FIG. 5A along a second lateral fastening projection 129-3, which is fastened to the first reinforcement region 119. Here, the second lateral fastening projection 129-3 is joined to a lateral fastening arm 145 and encloses a schematically illustrated cavity 147, and wherein a material bond by means of a lateral connection arm 149 to the further second reinforcement region 121-1 is shown.

The further second reinforcement region 121-2 formed by a separate sheet metal shell is, according to the illustration in FIG. 5B, analogous to the illustration in FIG. 5A, connected to the first reinforcement region 119 on both sides, and is also connected in a materially bonded manner to the second lateral fastening arm 129-3.

Figure 6:
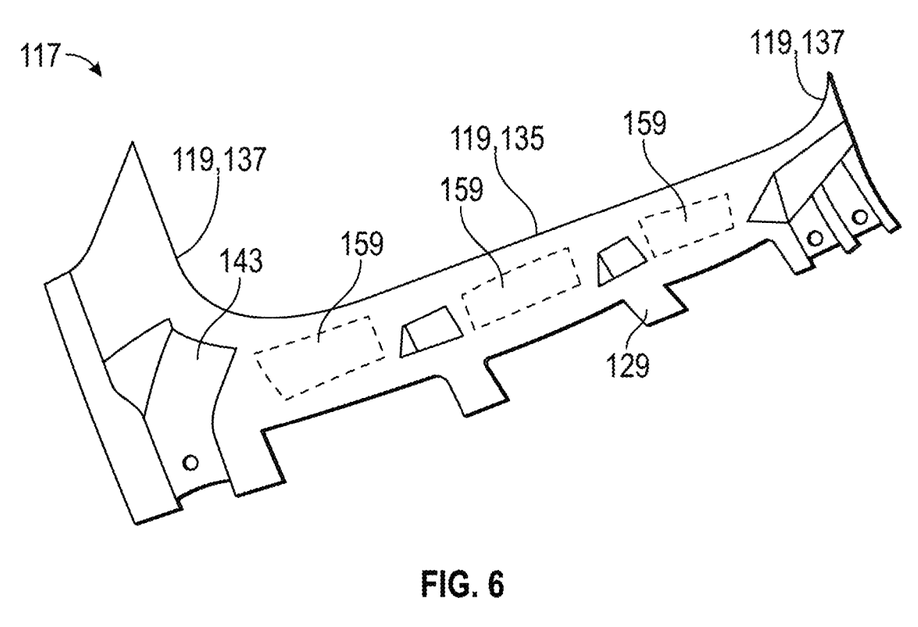
FIG. 6 shows a schematic representation of an external reinforcement of a battery holder according to a third example.

FIG. 6 shows a schematic representation of an external reinforcement 117 of a battery holder according to a third example.

The schematic representation shown in FIG. 6 of an external reinforcement 117 of a battery holder 100 according to a third example essentially corresponds to the battery holder 100 shown in FIG. 4 according to the second example, except that the first reinforcement region 119 has a plurality of stiffening areas 159, which are designed to increase the mechanical stability of the first reinforcement region 119 in order to ensure improved side impact protection. From FIG. 6 it can be seen that the stiffening areas 159 are arranged on the lateral area 135 of the first reinforcement region 119 of the external reinforcement 117.

Figure 7:
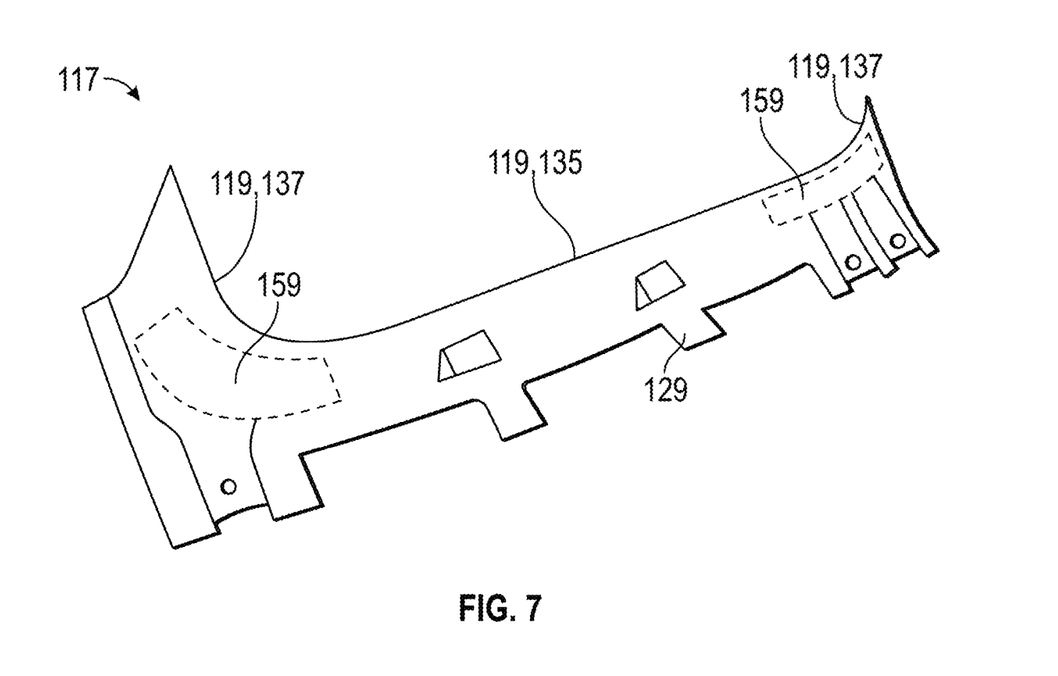
FIG. 7 shows a schematic representation of an external reinforcement of a battery holder according to a fourth example.

FIG. 7 shows a schematic representation of an external reinforcement of a battery holder according to a fourth example.

The external reinforcement 117 of a battery holder 100 according to the fourth example shown in FIG. 7 corresponds to the external reinforcement 117 of a battery holder 100 according to the third example shown in FIG. 6, except that the stiffening areas 159 are arranged in the corner regions 137 of the first reinforcement region 119 of the external reinforcement 117.

Figure 8:
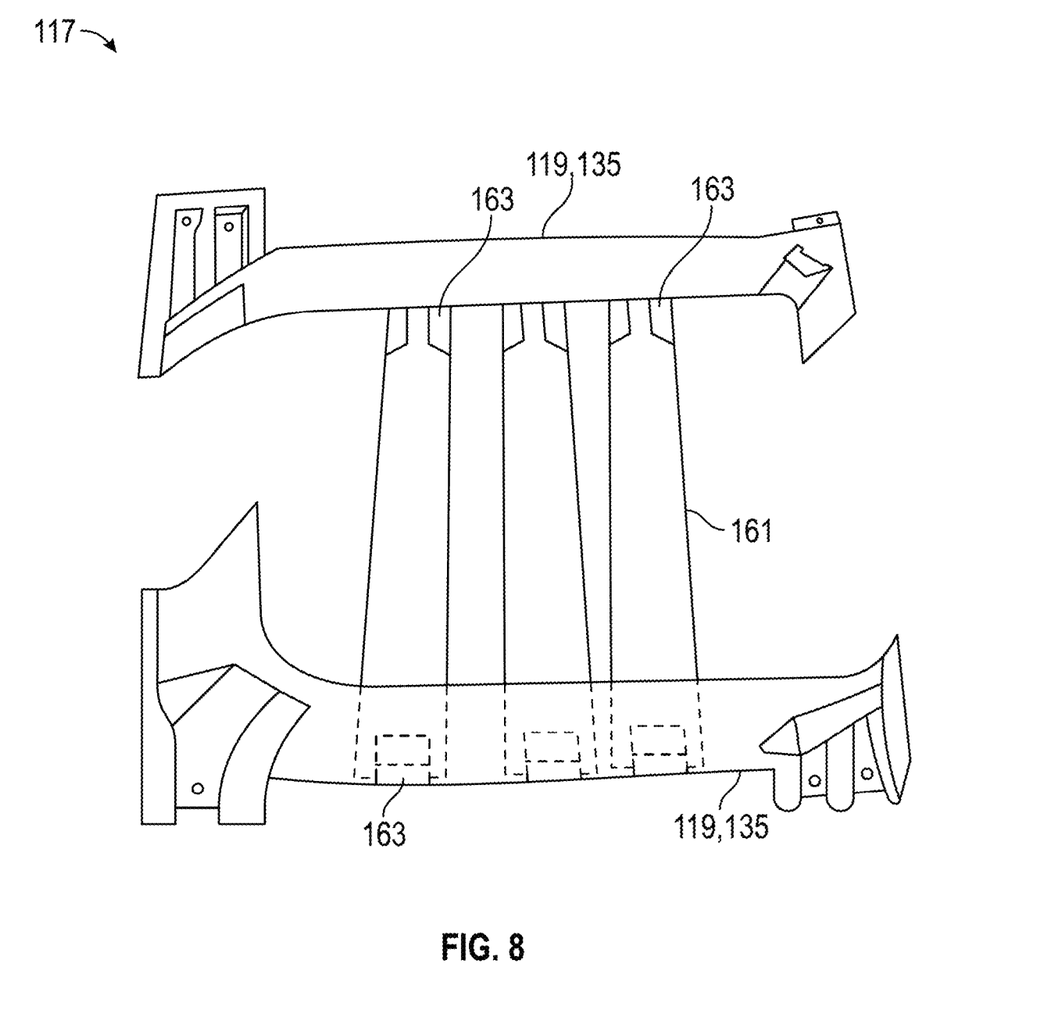
FIG. 8 shows a schematic representation of an external reinforcement of a battery holder according to a fifth example.

FIG. 8 shows a schematic representation of an external reinforcement of a battery holder according to a fifth example.

FIG. 8 shows two first reinforcement regions 119 of an external reinforcement 117 arranged on opposite sides of a receiving tray 101, not shown in FIG. 8, schematically.

The battery holder 100 has a plurality of stabilizing struts 161, in particular cross struts, which are arranged on a side of the base plate 101, not shown in FIG. 8, facing away from the outer wall 105, and are connected to the battery holder 100, in particular with the opposite first reinforcement regions 119 of the external reinforcement 117, in order to increase the structural stability of the battery holder 100. Each of the stabilization struts 161 is arranged and aligned so that it forms a straight, continuous load path with two opposite sides of the receiving tray 101 in order to transmit part of the impact energy from the impact side to the side facing away from the impact in the event of a side impact of the vehicle.

Here, a plurality of strut receptacles 163 are arranged on an underside of the first reinforcement regions 119, to which the respective stabilization struts 161 are attached, in order to achieve an effective attachment of the stabilization struts 161 to the battery holder 100, in particular to the first reinforcement regions 119.

REFERENCE NUMERALS 100 battery holder
101 receiving tray
102 sectional axis
103 base plate
105 outer wall
106 tray interior
107 inner struts
109 cover
111 external area of the battery holder
113 outer flange of the outer wall
115 further outer flange of the cover
117 external reinforcement
119 first reinforcement region
121 second reinforcement region
121-2 further second reinforcement region
123 hollow chamber
125 lateral side of the outer wall
127 corner connection of the outer wall
129 fastening projection
129-1 corner fastening projection
129-2 first lateral fastening projection
129-3 second lateral fastening projection
129-4 further lateral fastening projection
131 fastening opening
133 longitudinal extension direction of the outer reinforcement
135 Lateral region of the first reinforcement region
137 corner area of the first reinforcement region
139 further lateral region of the second reinforcement region
141 sheet metal projection
143 corner reinforcement element
145 lateral fastening arm
147 cavity
149 lateral connection arm
151 bend
151-1 first bend
151-2 second bend
151-3 third bend
153 distance
155 connecting line between two adjacent fastening openings
157 bent-up sections
159 stiffening areas
161 stabilization strut
163 strut receptacle

What is claimed is:

1. A battery holder for receiving a plurality of battery cells or battery modules in an electrically driven vehicle, comprising:
 a one-piece, uniform-material receiving tray configured to receive the plurality of battery cells or battery modules, the receiving tray having a base plate and an outer wall that is arranged circumferentially around the base plate, wherein the outer wall delimits a tray interior of the receiving tray;
 an external reinforcement, wherein the external reinforcement has:
  at least a first reinforcement region that is arranged on a lateral side of the outer wall facing away from the tray interior of the receiving tray and is connected to the outer wall, and
  at least a second reinforcement region that is arranged on a side of the first reinforcement region facing away from the tray interior of the receiving tray and is connected to the first reinforcement region, and wherein the second reinforcement region with the first reinforcement region delimits a hollow chamber at least partially; and
 a plurality of fastening projections formed in one piece with the external reinforcement, wherein:
  the plurality of fastening projections each have at least one fastening opening configured to receive a fastening screw that fastens the receiving tray to an underbody structure, comprising side skirts, of the electrically driven vehicle, and wherein:
  the plurality of fastening projections are oriented in a direction transverse to a longitudinal extension direction of the external reinforcement and are configured to point away from the hollow chamber.

2. The battery holder of claim 1, wherein:
the first reinforcement region comprises two first reinforcement regions that are arranged on opposite lateral sides of the outer wall, or
the first reinforcement region comprises four first reinforcement regions, two of the four first reinforcement regions arranged on opposite lateral sides of the outer wall.

3. The battery holder of claim 2, wherein:
the second reinforcement region comprises two second reinforcement regions that are arranged on opposite sides of the first reinforcement regions, or
the second reinforcement region comprises four second reinforcement regions, wherein two of the four second reinforcement regions are arranged on opposite sides of the first reinforcement regions.

4. The battery holder of claim 1, wherein the outer wall of the receiving tray has four lateral sides comprising two adjacent lateral sides connected to each other by a corner connection of two corner connections of the outer wall,
wherein the first reinforcement region has a lateral region that is connected in a materially bonded manner to one of the four lateral sides of the outer wall, and
wherein the first reinforcement region has two corner areas that are each connected in a materially bonded manner to one of the two corner connections of the outer wall.

5. The battery holder of claim 4, wherein the plurality of fastening projections comprises:
corner fastening projections that are formed in one piece with corner regions of the first reinforcement region, the corner fastening projections each having at least one fastening opening configured to receive a fastening screw that fastens the receiving tray to the underbody structure of the electrically driven vehicle.

6. The battery holder of claim 5, wherein the corner regions of the first reinforcement region each have a respective corner reinforcement element that structurally stabilize the corner regions of the first reinforcement region, and wherein the corner fastening projections are connected to the respective corner reinforcement element.

7. The battery holder of claim 1, wherein the first reinforcement region is formed from a high-strength steel or as a press-hardened first reinforcement region made of a steel that has a tensile strength between 1000 and 2000 MPa.

8. The battery holder of claim 1, wherein:
the first reinforcement region and the second reinforcement region of the external reinforcement are formed by different components, and wherein:
the second reinforcement region is shaped as a sheet metal shell, is connected in a materially bonded manner to the side of the first reinforcement region facing away from the tray interior of the receiving tray, and partially delimits the hollow chamber lengthwise between the second reinforcement region and the first reinforcement region.

9. The battery holder of claim 8, wherein:
the second reinforcement region comprises a further lateral region that is connected to a lateral region of the first reinforcement region and not to a corner region of the first reinforcement region, and wherein:
the second reinforcement region has at least one sheet metal projection that is connected in a materially bonded manner to a corner reinforcing element of the first reinforcement region.

10. The battery holder of claim 9, wherein the plurality of fastening projections comprises first lateral fastening projections that are formed in one piece with the lateral region of the first reinforcement region.

11. The battery holder of claim 10, wherein the plurality of fastening projections comprises second lateral fastening projections that are formed in one piece with a further lateral region of the second reinforcement region.

12. The battery holder of claim 11, wherein the first lateral fastening projections formed in one piece with the first reinforcement region and the second lateral fastening projections formed in one piece with the second reinforcement region are arranged in alignment with one another and are materially bonded to one another.

13. The battery holder of claim 12, wherein:
the first lateral fastening projections, the second lateral fastening projections, or both, are joined to a lateral fastening arm and together each enclose a cavity, and wherein:
the first lateral fastening projections and the second lateral fastening projections each have at least one fastening opening configured to receive a respective fastening screw that attaches the receiving tray to an underbody component of the electrically driven vehicle.

14. The battery holder of claim 13, wherein:
each respective lateral fastening projection of the first lateral fastening projections and the second lateral fastening projections has a lateral connection arm materially bonded to the lateral region of the first reinforcement region or to the further lateral region of the second reinforcement region, and wherein:
each respective lateral fastening projection extends at a substantially right angle from the lateral connection arm.

15. The battery holder of claim 14, wherein the at least one fastening opening of the respective lateral fastening projection is arranged on a side of the respective lateral fastening projection facing away from the lateral connection arm.

16. The battery holder of claim 1, wherein the first reinforcement region and the second reinforcement region of the external reinforcement are formed in one piece,
wherein a plurality of bent-up sections extend from the first reinforcement region on the side of the first reinforcement region facing away from the tray interior, the plurality of bent-up sections configured to form the second reinforcement region,
wherein the second reinforcement region formed as bent-up sections with the side of the first reinforcement region facing away from the tray interior of the receiving tray delimits at least one hollow chamber, and
wherein the bent-up sections of the second reinforcement region are connected, by a joining process, with the first reinforcement region to form the hollow chamber.

17. The battery holder of claim 16, wherein the plurality of fastening projections comprises further lateral fastening projections that are integrally formed with the first reinforcement region.

18. The battery holder of claim 17, wherein the further lateral fastening projections of the first reinforcement region are arranged between the plurality of bent-up sections of the second reinforcement region.

19. The battery holder of claim 1, wherein the battery holder has at least one cross strut that is arranged on a side of the base plate facing away from the outer wall and is connected with the battery holder, and wherein a structural stability of the battery holder is increased based at least in part on the at least one cross strut.

20. The battery holder of claim 19, wherein one cross strut of the at least one cross strut is configured to form a straight, continuous load path with two opposite sides of the receiving tray, and wherein the one cross strut is configured to transfer impact energy from a first side of the electrically driven vehicle to second a side facing away from the first side.

\* \* \* \* \*